United States Patent
Tune

(10) Patent No.: US 11,288,195 B2
(45) Date of Patent: Mar. 29, 2022

(54) DATA PROCESSING

(71) Applicant: Arm Limited, Cambridge (GB)

(72) Inventor: Andrew David Tune, Dronfield (GB)

(73) Assignee: Arm Limited, Cambridge (GB)

( * ) Notice: Subject to any disclaimer, the term of this patent is extended or adjusted under 35 U.S.C. 154(b) by 447 days.

(21) Appl. No.: 16/361,548

(22) Filed: Mar. 22, 2019

(65) Prior Publication Data
US 2020/0301837 A1    Sep. 24, 2020

(51) Int. Cl.
*G06F 12/0817* (2016.01)
*G06F 12/0882* (2016.01)
*G06F 12/1027* (2016.01)
*G06F 9/54* (2006.01)

(52) U.S. Cl.
CPC ...... G06F 12/0828 (2013.01); G06F 12/0882 (2013.01); *G06F 9/542* (2013.01); *G06F 12/1027* (2013.01)

(58) Field of Classification Search
CPC .. G06F 12/0828; G06F 12/0882; G06F 9/542; G06F 12/1027; G06F 13/00
See application file for complete search history.

(56) References Cited

U.S. PATENT DOCUMENTS

| | | | | |
|---|---|---|---|---|
| 2007/0294485 A1* | 12/2007 | Zeffer | ............... | G06F 12/0828 |
| | | | | 711/141 |
| 2017/0344479 A1* | 11/2017 | Boyer | ............... | G06F 12/0822 |
| 2017/0366238 A1* | 12/2017 | Chen | ................. | H04B 7/155 |
| 2018/0225214 A1* | 8/2018 | Mannava | ........... | G06F 12/0835 |

\* cited by examiner

*Primary Examiner* — Tuan V Thai
(74) *Attorney, Agent, or Firm* — Nixon & Vanderhye P.C.

(57) ABSTRACT

A data processing system comprises a requesting node; a home node to control coherency amongst data stored by the data processing system; and one or more further nodes, at least one of the further nodes having a memory; the requesting node being configured to issue a data handling transaction to the home node, the data handling transaction defining a data handling operation relating to a range of memory addresses, the requesting node being configured to maintain an address hazard at the requesting node inhibiting issue of another data handling transaction for that range of memory addresses until the requesting node is notified by the home node that the data handling transaction has completed; the home node being configured, in response to the data handling transaction, to issue one or more data handling instructions to cause one or more given nodes of the one or more further nodes to perform the data handling operation, the home node being configured to notify completion to the requesting node in response to the issue of the one or more data handling instructions to the one or more given nodes.

12 Claims, 5 Drawing Sheets

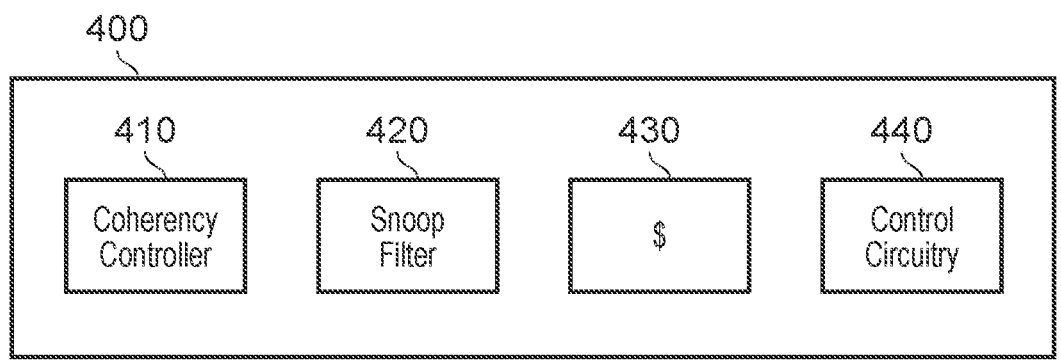
FIG. 4
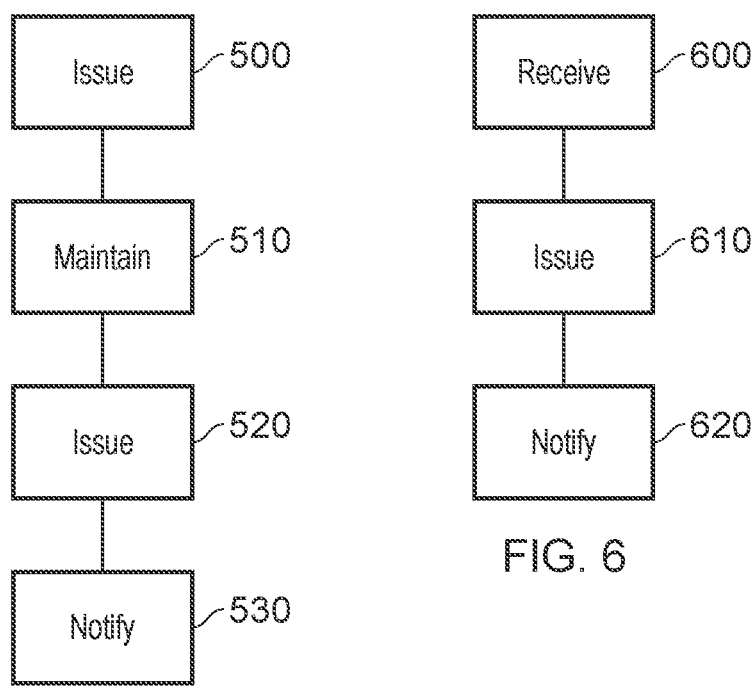
FIG. 5
FIG. 6

DATA PROCESSING

BACKGROUND

This disclosure relates to data processing methods and systems and to nodes such as home nodes within such systems.

It is known to provide data processing systems which execute data handling operations by a so-called requesting node (in a network of nodes, for example connected by interconnect circuitry) issuing a data handling transaction. In a coherent system, the data handling transaction is passed to a so-called home node responsible for determining at which memory the transaction should be fulfilled and for maintaining coherence between multiple copies of any individual memory address or data item.

The requesting node maintains a so-called address hazard until it receives confirmation that the data handling transaction has completed.

SUMMARY

In an example arrangement there is provided a data processing system comprising:

a requesting node;

a home node to control coherency amongst data stored by the data processing system; and one or more further nodes, at least one of the further nodes having a memory;

the requesting node being configured to issue a data handling transaction to the home node, the data handling transaction defining a data handling operation relating to a range of memory addresses, the requesting node being configured to maintain an address hazard at the requesting node inhibiting issue of another data handling transaction for that range of memory addresses until the requesting node is notified by the home node that the data handling transaction has completed;

the home node being configured, in response to the data handling transaction, to issue one or more data handling instructions to cause one or more given nodes of the one or more further nodes to perform the data handling operation, the home node being configured to notify completion to the requesting node in response to the issue of the one or more data handling instructions to the one or more given nodes.

In another example arrangement there is provided a home node comprising:

an interface to a requesting node configured to issue a data handling transaction to the home node, the data handling transaction defining a data transfer relating to a range of memory addresses, the requesting node being configured to maintain an address hazard at the requesting node inhibiting issue of another data handling transaction for that range of memory addresses until the requesting node is notified by the home node that the data handling transaction has completed;

an interface to one or more further nodes, at least one of the further nodes having a memory; and a coherency controller to control coherency amongst data stored by the data processing system;

the home node being configured, in response to the data handling transaction, to issue one or more data handling instructions to cause one or more given nodes of the one or more further nodes to perform the data transfer, the home node being configured to notify completion to the requesting node in response to the issue of the data handling instructions to the one or more given nodes.

In another example arrangement there is provided a method comprising:

a requesting node issuing a data handling transaction to a home node in a data processing system having the requesting node, the home node to control coherency amongst data stored by the data processing system and one or more further nodes, at least one of the further nodes having a memory, the data handling transaction defining a data transfer relating to a range of memory addresses;

the requesting node maintaining an address hazard at the requesting node inhibiting issue of another data handling transaction for that range of memory addresses until the requesting node is notified by the home node that the data handling transaction has completed;

the home node, in response to the data handling transaction, issuing one or more data handling instructions to cause one or more given nodes of the one or more further nodes to perform the data transfer; and the home node notifying completion to the requesting node in response to the issue of the one or more data handling instructions to the one or more given nodes.

In another example arrangement there is provided a method comprising:

a home node receiving a data handling transaction issued by a requesting node in a data processing system having the requesting node, the home node to control coherency amongst data stored by the data processing system and one or more further nodes, at least one of the further nodes having a memory, the data handling transaction defining a data transfer relating to a range of memory addresses;

the home node, in response to the data handling transaction, issuing one or more data handling instructions to cause one or more given nodes of the one or more further nodes to perform the data transfer; and the home node notifying completion of the data handling transaction to the requesting node in response to the issue of the one or more data handling instructions to the one or more given nodes.

Further aspects and features of the present disclosure are defined by the appended claims.

BRIEF DESCRIPTION OF THE DRAWINGS

The present technique will be described further, by way of example only, with reference to embodiments thereof as illustrated in the accompanying drawings, in which:

FIG. 4 schematically illustrates a home node;

FIGS. 5 and 6 are schematic flowcharts illustrating respective methods.

DESCRIPTION OF EMBODIMENTS

Figure 1:
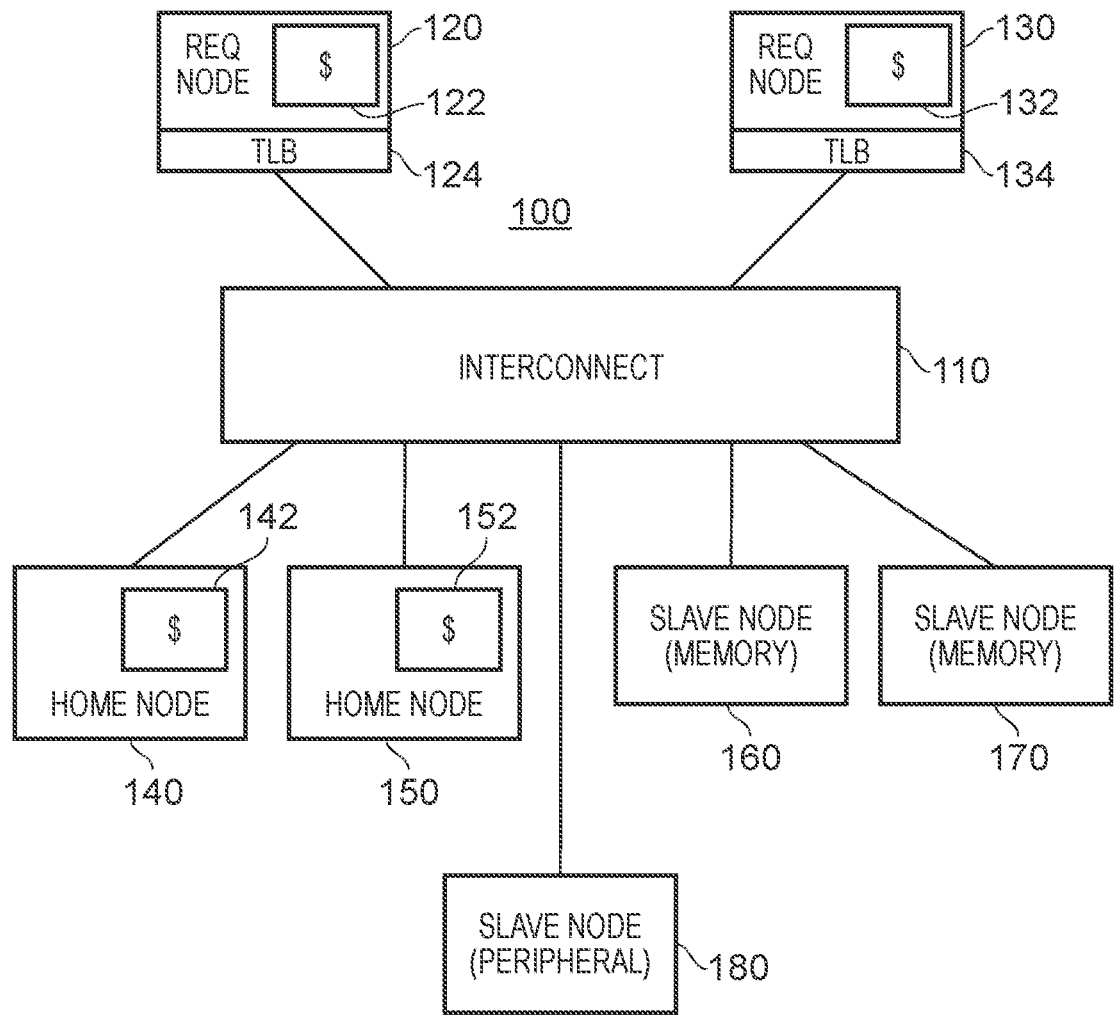
FIG. 1 schematically illustrates a data processing system.

Before discussing the embodiments with reference to the accompanying figures, the following description of embodiments is provided.

An example embodiment provides a data processing system comprising:

a requesting node;

a home node to control coherency amongst data stored by the data processing system; and one or more further nodes, at least one of the further nodes having a memory;

the requesting node being configured to issue a data handling transaction to the home node, the data handling transaction defining a data handling operation relating to a range of memory addresses, the requesting node being configured to maintain an address hazard at the requesting node inhibiting issue of another data handling transaction for that range of memory addresses until the requesting node is notified by the home node that the data handling transaction has completed;

the home node being configured, in response to the data handling transaction, to issue one or more data handling instructions to cause one or more given nodes of the one or more further nodes to perform the data handling operation, the home node being configured to notify completion to the requesting node in response to the issue of the one or more data handling instructions to the one or more given nodes.

In example embodiments, rather than a data transfer such as a block data transfer involving multiple memory addresses having to be conducted by individual transfers initiated by the requesting node, or in any event by the requesting node having to maintain an address hazard until completion of the entire block data transfer, the data handling transaction relating to the block data transfer can be passed to the home node which is then in a position to notify completion to the requesting node once the one or more data handling instructions have been passed to the given nodes actually executing the data handling operation. This can allow the address hazard at the requesting node to be terminated much sooner than would otherwise be possible. The arrangement applies whether or not the home mode directly instructs the one or more given nodes to perform the data handling operation. If for example (as discussed below) the home node has to issue a further data handling transaction to another intermediate home node, the home node still is able to notify completion to the requesting node once the one or more given nodes have been instructed.

In example embodiments the home node is configured to maintain an address hazard at the home node inhibiting acceptance by the home node of another data handling transaction for that range of memory addresses until the home node is notified that the data handling operation has completed. However, as discussed above, by allowing the requesting node to release its own address hazard at a potentially much earlier stage in the process, the requesting node is freed up so that it can undertake different processing tasks in the meantime.

The arrangement is applicable to various types of data handling transaction such as read, write, copy, move or other transactions. In example embodiments, however, the data handling transaction defines a data transfer from a source range of addresses to a destination range of addresses. In such arrangements, conveniently the home node may be configured to issue one or more data handling instructions to cause a further node holding addresses within the destination range of addresses to read data from a further node holding addresses within the source range of addresses.

In the example case of a data transfer operation, a further node holding addresses within the destination range of addresses is configured to notify completion to the home node after the completion of reading data from the further node holding addresses within the source range of addresses.

The present techniques are also applicable to arrangements having multiple home nodes and in particular to systems having a first home node to control coherency for addresses within the destination range of addresses and a second home node to control coherency for addresses within the source range of addresses. Although the requesting node could initially send its data handling transaction to either the first home node or the second home node, in example embodiments the requesting node is configured to issue the data handling transaction to the first home node; and in response to the data handling transaction issued by the requesting node: the first home node is configured to issue one or more data handling instructions to the second home node; and the second home node is configured to issue one or more data handling instructions to the one or more given nodes.

In such arrangements, in order to conveniently provide the early completion notification discussed above to the requesting node, in example embodiments the second home node is configured to notify completion to the first home node in response to the second home node issuing the one more data handling instructions to the one or more given nodes; and the first home node is configured to notify completion to the requesting node in response to the second home node notifying completion to the first home node.

In some example arrangements, the requesting node is configured to initiate data handling transactions according to virtual memory addresses in a virtual memory address space; the one or more further nodes are configured to access memory according to physical memory addresses in a physical memory address space; and the system comprises memory address translation circuitry configured to provide memory address translations between virtual memory addresses and physical memory addresses in units of memory pages having a page size. To avoid the need for retrieving other address translations during a block copy, transfer or other data handling operation, in example arrangements the range of memory addresses for a given data handling transaction issued by the requesting node to the home node lies within a single memory page.

Another example type of data handling operation comprises setting a predetermined value to memory addresses in the range of memory addresses.

Although the further nodes may include, for example, cache memories held at other requesting nodes, in example arrangements at least some of the one or more further nodes are slave nodes.

The teachings of the present disclosure may be embodied as a home node, so that another example embodiment provides a home node comprising:

an interface to a requesting node configured to issue a data handling transaction to the home node, the data handling transaction defining a data transfer relating to a range of memory addresses, the requesting node being configured to maintain an address hazard at the requesting node inhibiting issue of another data handling transaction for that range of memory addresses until the requesting node is notified by the home node that the data handling transaction has completed;

an interface to one or more further nodes, at least one of the further nodes having a memory; and a coherency controller to control coherency amongst data stored by the data processing system;

the home node being configured, in response to the data handling transaction, to issue one or more data handling instructions to cause one or more given nodes of the one or more further nodes to perform the data transfer, the home node being configured to notify completion to the requesting node in response to the issue of the data handling instructions to the one or more given nodes.

Another example embodiment provides a method comprising:

a requesting node issuing a data handling transaction to a home node in a data processing system having the requesting node, the home node to control coherency amongst data stored by the data processing system and one or more further nodes, at least one of the further nodes having a memory, the data handling transaction defining a data transfer relating to a range of memory addresses;

the requesting node maintaining an address hazard at the requesting node inhibiting issue of another data handling transaction for that range of memory addresses until the requesting node is notified by the home node that the data handling transaction has completed;

the home node, in response to the data handling transaction, issuing one or more data handling instructions to cause one or more given nodes of the one or more further nodes to perform the data transfer; and the home node notifying completion to the requesting node in response to the issue of the one or more data handling instructions to the one or more given nodes.

Another example embodiment provides a method comprising:

a home node receiving a data handling transaction issued by a requesting node in a data processing system having the requesting node, the home node to control coherency amongst data stored by the data processing system and one or more further nodes, at least one of the further nodes having a memory, the data handling transaction defining a data transfer relating to a range of memory addresses;

the home node, in response to the data handling transaction, issuing one or more data handling instructions to cause one or more given nodes of the one or more further nodes to perform the data transfer; and the home node notifying completion of the data handling transaction to the requesting node in response to the issue of the one or more data handling instructions to the one or more given nodes.

Referring now to the drawings, FIG. 1 schematically illustrates a data processing system 100 comprising interconnect circuitry 110 to which one or more requesting data handling nodes (for example, so-called master nodes, for example processing elements or CPUs) such as nodes 120, 130 are connected. One or more home nodes 140, 150 are provided along with various slave nodes 160, 170 (both being memory nodes) and 180 (in this example, a peripheral device).

The system of FIG. 1 operates in respect of so-called data handling transactions. The slave nodes respond to data handling transactions that cannot themselves initiate data handling transactions. In the course of a data handling transaction, for example, one of the requesting nodes might request a data item to be accessed at a memory address. The interconnect 110 routes the transaction to a home node responsible for that memory address which then in turn determines (a) where the memory access operation should physically take place, and (b) whether any other copies of the same memory address held by the overall system 100 need to be updated and/or invalidated as a result of the data handling transaction. In particular, typically each of the home nodes 140, 150 (and any others which may be provided) is responsible for a respective portion of the memory space, so that for a particular data handling transaction, the interconnect 110 routes the transaction to the appropriate home node which then issues data handling instructions to one or more further nodes (which could be slave nodes, other home nodes or even other requesting nodes if, for example, the only copy or the most relevant copy of the required data is held by a cache memory 122, 132 of another requesting node). Other aspects of handling a data handling transaction will be discussed below with reference to schematic timing diagrams of FIGS. 2 and 3.

Various cache memories are provided within the system, for example the cache memories 122, 132 of the requesting nodes. The home nodes may also be provided with cache memories 142, 152 and indeed a cache memory may be provided (though not shown in FIG. 1) at the interconnect 110.

The home nodes 140, 150 are responsible for so-called coherence in their respective memory regions. This will be discussed further below.

One other aspect of FIG. 1 is the use of memory address translation. It is known in systems such as that shown in FIG. 1 for the requesting nodes 120, 130 to operate and initiate data handling transactions according to virtual memory addresses in a virtual memory address space. However, nodes which can service those data handling transactions (further nodes such as home nodes, slave nodes or other requesting node cache memories) are configured to access the physical memory resources according to physical memory addresses in a physical memory address space. Therefore, memory address translation circuitry is provided so as to provide memory address translations between virtual memory addresses and physical memory addresses. In the example of FIG. 1, so-called translation lookaside buffers (TLBs) 124, 134 are associated with each of the requesting nodes 120, 130. The TLBs store translation data defining memory address translations, which translation data is then used in connection with translating data handling transactions initiated by the respective requesting node. In the event that the respective TLB does not store a required memory address translation, the memory address translation can be obtained by the TLB from tables held in memory, for example by a so-called page table walk (PTW) process.

The use of the PTW process and the efficient use of storage in a TLB implies that the memory address translations are defined in units of memory pages having a page size such as 4 KB. Other page sizes could be used.

Therefore, FIG. 1 provides an example of a data processing system 100 comprising:

a requesting node (120, 130);

a home node (140, 150) to control coherency amongst data stored by the data processing system; and one or more further nodes (such as slave nodes 160, 170, but may also include the other of 120, 130, the other of 140, 150), at least one of the further nodes having a memory (122, 132, 142, 152, 160, 170);

the requesting node being configured to issue a data handling transaction to the home node, the data handling transaction defining a data handling operation relating to a range of memory addresses, the requesting node being configured to maintain an address hazard at the requesting node inhibiting issue of another data handling transaction for that range of memory addresses until the requesting node is notified by the home node that the data handling transaction has completed;

the home node being configured, in response to the data handling transaction, to issue one or more data handling instructions to cause one or more given nodes of the one or more further nodes to perform the data handling operation, the home node being configured to notify completion to the requesting node in response to the issue of the one or more data handling instructions to the one or more given nodes.

Figure 2:
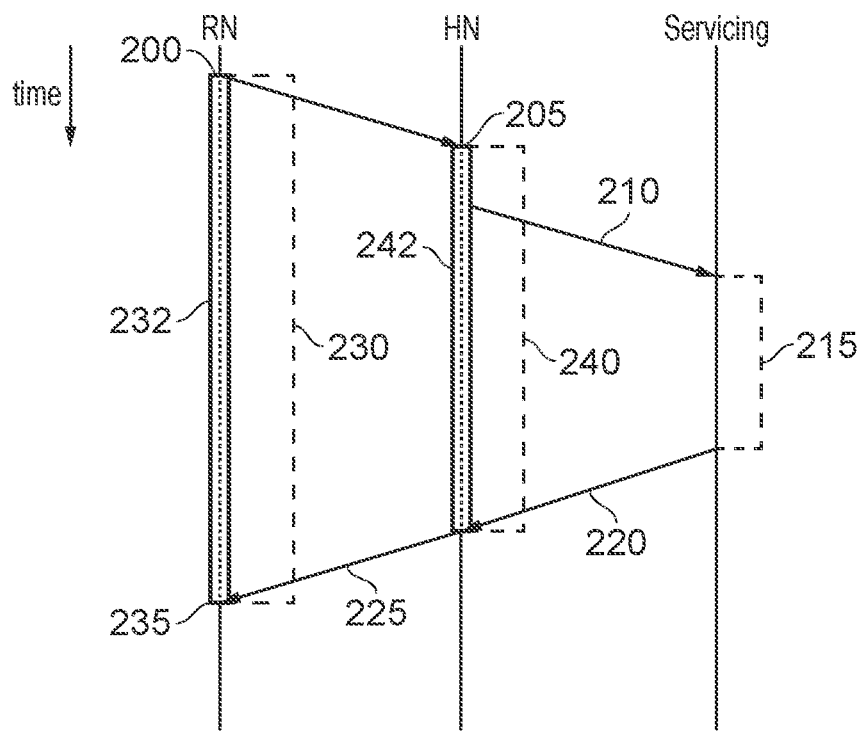
FIG. 2 schematically illustrates the processing of a data handling transaction.
Figure 3:
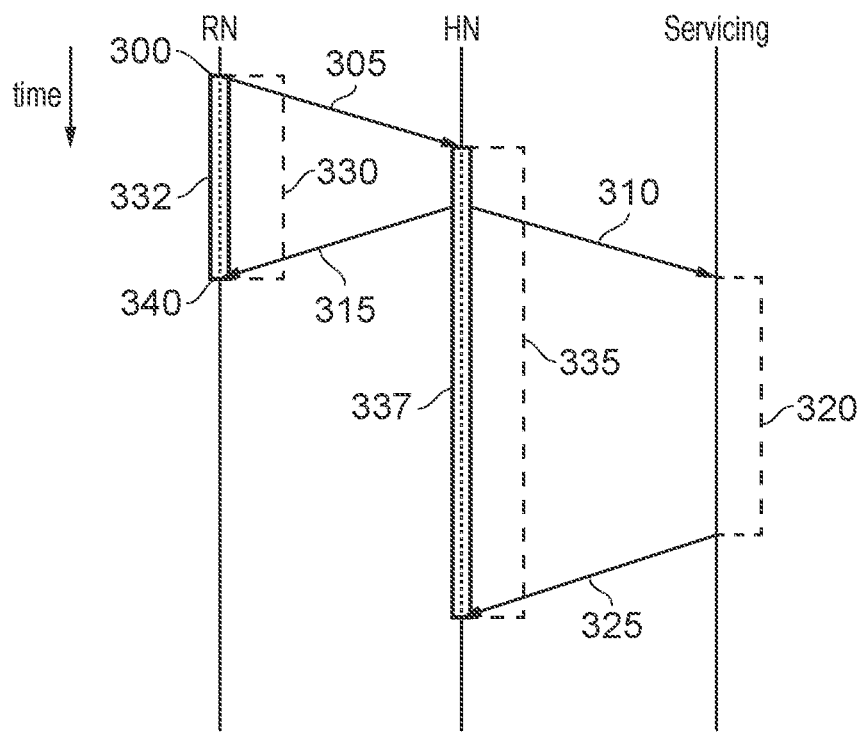
FIG. 3 schematically illustrates the processing of a data handling transaction according to embodiments of the present disclosure.

FIGS. 2 and 3 are schematic timing diagrams illustrating the processing of data handling transactions.

FIG. 2 applies to previously proposed data processing systems and also to some types of data handling transaction in the system of FIG. 1, namely data handling transactions relating to individual memory addresses.

Time is shown running vertically down the page in each of FIGS. 2 and 3. A left hand line shows actions by a requesting node such as a requesting node 120, 130. A middle line shows actions by a home node such as one of the home nodes 140, 150. A right hand line shows the ultimate servicing of the data handling transaction, though without (in this particular schematic case) specifying exactly which node or nodes service the transaction.

In FIG. 2, the requesting node initiates a transaction at a time point 200 and issues the transaction to the home node which receives it at a time point 205. The home node issues data handling instructions 210 to the servicing node or nodes which execute the data handling instructions during a time period 215 before returning a response 220 to the home node which then returns a response to 225 to the requesting node. The response may be a confirmation that (for example) a data write has taken place or, in a case of a data read, the response may be the required data itself.

The requesting node maintains a so-called address hazard 232 for a period 230. During this period, the requesting node is inhibited from issuing another data handling transaction for the same memory address. The period 230 starts with the time point 200 at which the requesting node issues the data handling transaction and ends when the requesting node is notified (at a time 235) of completion of the transaction by the home node.

Similarly, the home node maintains an address hazard 242 for a period 240, starting from the receipt of the transaction from the requesting node and ending with receipt of the notification of completion 220 from the servicing node. During this period the home node is inhibited from handling another transaction relating to the same memory address, though the home node may schedule another such transaction to follow the current transaction.

Turning to FIG. 3, once again, operations by the requesting node, the home node and the servicing node(s) are shown schematically and relate to a data handling operation for a range of memory addresses, such as a block copy, move, or set to a certain or predetermined value (such as zero). In such arrangements, the data handling transaction defines a data transfer from a source range of addresses to a destination range of addresses. Such a data handling transaction is issued at a time 300 by the requesting node. The transaction 305 is routed to the home node which in turn issues one or more data handling instructions 310 to cause one or more given nodes of the further nodes (slave nodes, cache memories at other requesting nodes or the like) to perform the data handling operation. In contrast to FIG. 2, however, the home node issues a notification 315 of completion to the requesting node in response to the issue of the one or more data handling instructions 310.

The transaction issued by the requesting node in the example of FIG. 3 may define at least the following fields: Command Type (copy, move, coherent, not coherent); Source Base Address or index; Destination Base Address or index; Transaction Identifier (which will be used in the completion response); Length in bytes. In the example of an NoC which may have a narrow address bus, the command may be implemented as a two-flit (flow control unit) packet, implying that there is no need (in the implementation of the present techniques) to widen the address bus width.

The data handling instructions 310 are serviced during a period 320, a process which will be described in more detail below, resulting in notification to the home node of completion 325.

A significant difference with reference to FIG. 2 is that requesting node needs to maintain an address hazard 332 only for the period 330. The home nodes maintains an address hazard which inhibits acceptance by the home node of another data handling transaction for the range of memory addresses concerned by the transaction 305 until the home node is notified that the original data handling transaction 305 has been completed. Therefore the home node maintains an address hazard 337 for a period 335. In the meantime, however, from the time 340 onwards, the requesting node can continue with other operations.

FIG. 4 schematically illustrates aspects of a home node such as the home node 140 or the home node 150 of FIG. 1. In FIG. 4, the home node 400 comprises a coherency controller 410 which cooperates with a so-called snoop filter 420 to manage coherency across at least that part of the data processing system 100 for which the home node 400 is responsible.

Note that although the home node is drawn separately in FIG. 1 for clarity of the explanation, in some examples it may form a part of the interconnect circuitry 110, either in terms of forming part of its functionality and/or forming a part of its physical implementation.

The role of logic associated with the coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this can include (for example) the use of the snoop filter 420.

The term "snoop filter" is a historical one and is used here to refer to a control device forming part of the coherency controller 410 having an associated "directory", where the directory stores information indicating which data is stored in which cache or memory, and the snoop filter itself at least contributes to the handling of data accesses to cached or stored information so as to provide a coherence function.

In the present example, a snoop filter, having a directory as discussed above and a register indicating those cache or other memories which are currently part of the coherency control arrangement (otherwise referred to as being in the coherent system or in the coherent domain) is associated with (or in other examples may be part of) the coherency controller 410 associated with the home node 400.

The snoop filter handles at least a part of a process under which, when any of the requesting nodes 120, 130 intends to access or modify data which is stored as a cache line in any of the cache memories, that requesting node obtains permission to do so. As part of this process, the snoop filter checks whether any other cache memories have a copy of the line which is to be modified. If any other copies are in existence at other cache memories, then those copies need to be cleared and invalidated. If those copies themselves contain modifications to the stored data in that line, then in at least some circumstances, the coherency controller 410 (or the snoop filter itself) instructs the cache memory to write that line back to main memory.

The snoop filter also maintains a record of where any data item is stored, and updates this in response to data handling operations.

The home node 400 also comprises a cache memory 430 and control circuitry 440. Operations carried out by the control circuitry will be discussed below with reference to FIGS. 5 and 6.

By way of summary of the techniques discussed above and described in detail below, two schematic flowcharts are now provided as FIGS. 5 and 6. FIG. 5 relates to techniques for the operation of the overall system 100 of FIG. 1. FIG. 6 relates to operations of the home node acting in connection with a particular data handling transaction (noting that the transaction is routed to the relevant home node, if there are multiple home nodes, in dependence upon the destination address range.

Regarding the overall system, FIG. 5 is a schematic flowchart illustrating a method comprising:

a requesting node (such as the requesting node 120, 130) issuing at a step 500 a data handling transaction to a home node in a data processing system having the requesting node, the home node to control coherency amongst data stored by the data processing system and one or more further nodes, at least one of the further nodes having a memory, the data handling transaction defining a data transfer relating to a range of memory addresses;

the requesting node maintaining at a step 510 an address hazard at the requesting node inhibiting issue of another data handling transaction for that range of memory addresses until the requesting node is notified by the home node that the data handling transaction has completed;

the home node (such as the home node 140, 150), in response to the data handling transaction, issuing at a step 520 one or more data handling instructions to cause one or more given nodes of the one or more further nodes to perform the data transfer; and the home node notifying at a step 530 completion to the requesting node in response to the issue of the one or more data handling instructions to the one or more given nodes.

For the home node (such as the home node 140, 150) a method in FIG. 6 comprises:

a home node receiving at a step 600 a data handling transaction issued by a requesting node in a data processing system having the requesting node, the home node to control coherency amongst data stored by the data processing system and one or more further nodes, at least one of the further nodes having a memory, the data handling transaction defining a data transfer relating to a range of memory addresses;

the home node, in response to the data handling transaction, issuing at a step 610 one or more data handling instructions to cause one or more given nodes of the one or more further nodes to perform the data transfer; and the home node notifying at a step 620 completion of the data handling transaction to the requesting node in response to the issue of the one or more data handling instructions to the one or more given nodes.

The method steps of FIG. 6 and the method steps 520, 530 of FIG. 5, are performed, in example embodiments, by the control circuitry 440 of FIG. 4.

As discussed above, the early provision of a completion notification to the requesting node (for example, providing early "global observability") is such that the requesting node can terminate its address hazard sooner than in the previously proposed arrangements, even before the operation has completed, so that the home node (rather than the requesting node) oversees the performance of a block- or range-based data handling transaction. Note that if this arrangement when not in use, then the global observability response would not be given until the last memory transfer in the entire operation from the final point of serialisation (for example, a memory controller).

The memory address translation arrangements discussed above are relevant to block-or range-based transactions.

In the arrangement discussed with reference to FIG. 1, the requesting node is configured to initiate data handling transactions according to virtual memory addresses in a virtual memory address space, the one or more further nodes are configured to access memory according to physical memory addresses in a physical memory address space and the system comprises memory address translation circuitry 124, 134 configured to provide memory address translations between virtual memory addresses and physical memory addresses in units of memory pages having a page size.

In the case of a block or range transaction, it could be inconvenient to have to seek a further address translation (which could require reference back to the requesting node, which in the present embodiments would probably by then have been notified that the block or range operation had in fact completed). To avoid having to do this, in example embodiments the range of memory addresses for a given data handling transaction issued by the requesting node to the home node is such that (or is constrained that) it lies within a single memory page.

Figure 7:
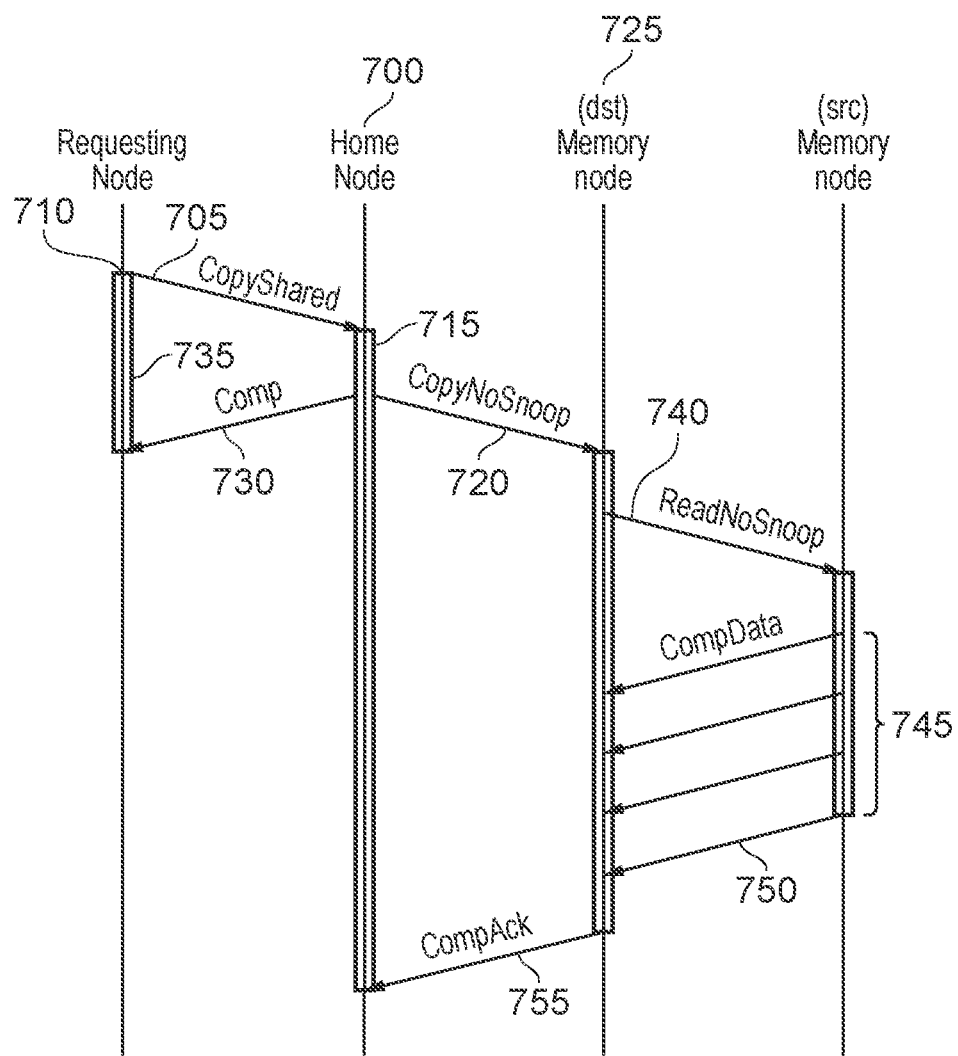
FIGS. 7 and 8 are schematic timing diagrams.

FIG. 7 is a schematic timing diagram illustrating an example of the operation of the system described above in a case where a range of memory addresses is to be copied from one location in memory to another location in memory, which involves copying from a source node (src) to a destination node (dst). Once again, time is shown progressing downwards in the diagrams.

In the example of FIG. 7, coherency for both the source and target memory address ranges is handled by a single home node 700. A requesting node, being one of the requesting nodes 120, 130 in FIG. 1 issues a CopyShared transaction 705 (a coherent copy transaction) at a time 710. When this is received by the home node, the home node 700 initiates a period 715 during which an address hazard is maintained for the ranges of addresses specified by the CopyShared transaction 705.

The home node is responsible for coherency within the relevant memory address ranges and so in turn issues a CopyNoSnoop instruction 720 to the further node 725 at which the destination range of memory addresses is stored. The CopyNoSnoop instruction is a non-coherent instruction, which is used at this stage on the grounds that the home node which issues the instruction is itself in control of coherency across (at least its share of) the system, so it does not need operations relating to addresses for which it is responsible and which take place downstream of the home node to be handled coherently. In response to the issue of the CopyNoSnoop instruction (for example, at the same time), the home node 700 notifies completion 730 to the requesting node which then terminates its period 735 of address hazard for the relevant address ranges.

The CopyNoSnoop instruction is received by the destination memory node 725 which in turn executes a ReadNoSnoop instruction 740 (again a non-coherent instructions) which it sends to the source memory node. The source memory node responds with responses comprising one or more transmissions 745 of the required data to be copied to the destination node, with each of the one or more portions of data being accompanied by a completion notification relating to that portion of data. In the case of the final response or portion 750, notification of completion of transmission of that portion represents the completion of the copy operation initiated by the instruction 720 so that the destination memory node 725 can send a completion acknowledgment 755 to the home node, allowing the home node to terminate its own period 715 of the address hazard.

Figure 8:
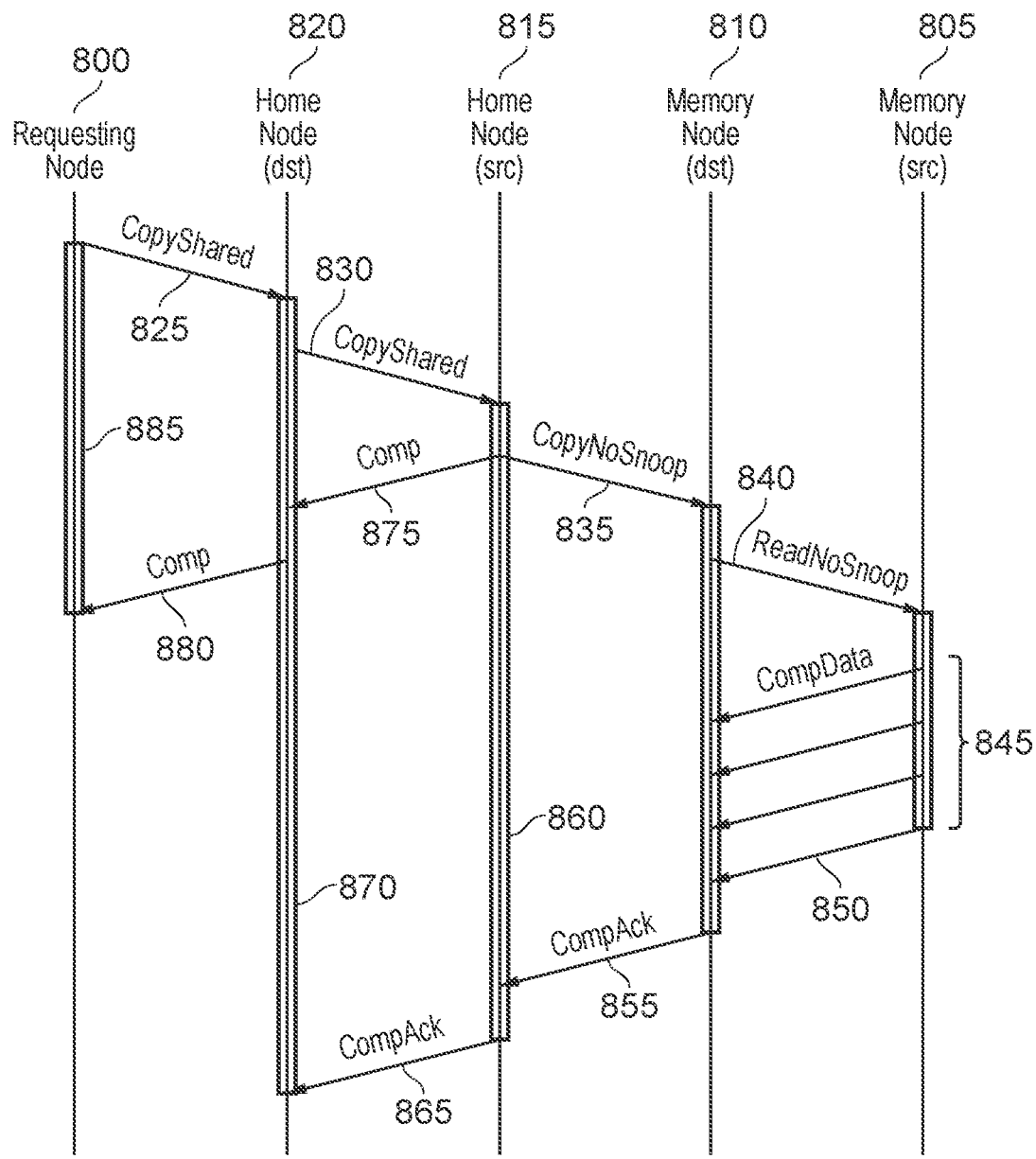

Note that in FIG. 7 and indeed in FIG. 8, hazards can also be used to lock the source and destination regions of the copy. The source region needs only to be made read-only, whereas for the destination region the hazard can be such that read and write accesses are prevented during the period. Hazard periods are shown schematically in FIGS. 7 and 8 by slim vertical rectangles.

FIG. 8 is a schematic representation of another example embodiment in which a requesting node 800 is requesting a block of data to be copied from a source memory range to a destination memory range, where the source memory range is stored at a source memory node (slave node) 805 and the destination memory range is stored at a destination memory node 810, each of which is overseen (for coherency control purposes) by a different respective home node, namely a source home node 815 and a destination home node 820.

To initiate the process, the requesting node sends a CopyShared transaction 825 to the destination home node 820 which in turn sends a CopyShared transaction 830 to the source home node 815. Note that the transaction 830 from the home node 820 to the home node 815 is a coherent transaction, because the overall data handling operation involves some memory addresses for which the home node 820 is not itself responsible.

In response, the source home node 815 issues a CopyNoSnoop instruction 835 to the destination memory node which issues a ReadNoSnoop instruction 840 to the source memory node. The source memory node replies with one or more portions 845 of the requested data, with a last portion 850 representing an acknowledgment of completion of the read operation. In response, the destination memory node 810 sends a completion acknowledgment 855 to the source home node 815 which, in response, terminates its period 860 of address hazard and sends a completion acknowledgement 865 to the destination home node 820 which in turn terminates its own period 870 of address hazard.

Returning to the issue of the CopyNoSnoop instruction 835, in response to its issue (for example at the same time) the source home node 815 sends a completion acknowledgement 875 to the destination home node which, in response, sends a completion acknowledgement 880 to the requesting node which can then terminates its period 885 of address hazard.

It can therefore be seen that it is in response to the completion notification 875, which indicates that the instructions 835 have been issued to the given node(s), that the first home node 820 notifies completion to the requesting node. At the subsequent completion acknowledgement 865 (indicating that the overall operation has been completed and the transaction fulfilled) the first home node releases its address hazard.

Therefore, FIG. 8 provides an example of an arrangement comprising a first home node 820 to control coherency for addresses within the destination range of addresses and a second home node 815 to control coherency for addresses within the source range of addresses.

As shown in FIG. 8, the requesting node 800 is configured to issue the data handling transaction 825 to the first home node 820; and in response to the data handling transaction issued by the requesting node: the first home node 820 is configured to issue one or more data handling instructions 830 to the second home node 815; and the second home node 815 is configured to issue one or more data handling instructions 835 to the one or more given nodes 810.

Again referring to FIG. 8, this is an example in which the second home node 815 is configured to notify completion 875 to the first home node 820 in response to the second home 815 node issuing the one more data handling instructions 835 to the one or more given nodes 810; and the first home node 820 is configured to notify completion 880 to the requesting node 800 in response to the second home node 815 notifying completion 875 to the first home node 820.

Note that the instruction 720, and indeed the transaction request 830, provide examples in which the home node is configured to issue one or more data handling instructions to cause a further node holding addresses within the destination range of addresses to read data from a further node holding addresses within the source range of addresses. In either situation, they have the ultimate effect of directly or indirectly causing the destinations node to read the required data from the source node.

The completion notifications 855, 755 provide examples in which the further node holding addresses within the destination range of addresses is configured to notify completion to the home node after the completion of reading data from the further node holding addresses within the source range of addresses.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data processing system comprising:
    a requesting node;
    a home node to control coherency amongst data stored by the data processing system; and
    one or more further nodes, at least one of the further nodes having a memory;
    the requesting node being configured to issue a data handling transaction to the home node, the data handling transaction defining a data handling operation relating to a range of memory addresses, the requesting node being configured to maintain an address hazard at the requesting node inhibiting issue of another data handling transaction for that range of memory addresses until the requesting node is notified by the home node that the data handling transaction has completed; and
    the home node being configured, in response to the data handling transaction, to issue one or more data handling instructions to cause one or more given nodes of the one or more further nodes to perform the data handling operation, the home node being configured to notify completion to the requesting node in response to the issue of the one or more data handling instructions to the one or more given nodes, wherein the requesting node is configured to initiate data handling transactions according to virtual memory addresses in a virtual memory address space;

the one or more further nodes are configured to access memory according to physical memory addresses in a physical memory address space;

the system comprises memory address translation circuitry configured to provide memory address translations between virtual memory addresses and physical memory addresses in units of memory pages having a page size; and the range of memory addresses for a given data handling transaction issued by the requesting node to the home node lies within a single memory page.

2. A system according to claim 1, in which the home node is configured to maintain an address hazard at the home node inhibiting acceptance by the home node of another data handling transaction for that range of memory addresses until the home node is notified that the data handling operation has completed.

3. A system according to claim 1, in which the data handling transaction defines a data transfer from a source range of addresses to a destination range of addresses.

4. A system according to claim 3, in which the home node is configured to issue one or more data handling instructions to cause a further node holding addresses within the destination range of addresses to read data from a further node holding addresses within the source range of addresses.

5. A system according to claim 4, in which the further node holding addresses within the destination range of addresses is configured to notify completion to the home node after the completion of reading data from the further node holding addresses within the source range of addresses.

6. A system according to claim 5, in which:

the requesting node is configured to issue the data handling transaction to the first home node;

and in response to the data handling transaction issued by the requesting node:

the first home node is configured to issue one or more data handling instructions to the second home node; and the second home node is configured to issue one or more data handling instructions to the one or more given nodes.

7. A system according to claim 6, in which:

the second home node is configured to notify completion to the first home node in response to the second home node issuing the one more data handling instructions to the one or more given nodes; and the first home node is configured to notify completion to the requesting node in response to the second home node notifying completion to the first home node.

8. A system according to claim 4, comprising a first home node to control coherency for addresses within the destination range of addresses and a second home node to control coherency for addresses within the source range of addresses.

9. A system according to claim 1, in which the data handling operation comprises setting a predetermined value to memory addresses in the range of memory addresses.

10. A system according to claim 1, in which at least some of the one or more further nodes are slave nodes.

11. A home node comprising:

an interface to a requesting node configured to issue a data handling transaction to the home node, the data handling transaction defining a data transfer relating to a range of memory addresses, the requesting node being configured to maintain an address hazard at the requesting node inhibiting issue of another data handling transaction for that range of memory addresses until the requesting node is notified by the home node that the data handling transaction has completed, the requesting node being further configured to initiate data handling transactions according to virtual memory addresses in a virtual memory address space;

an interface to one or more further nodes, at least one of the further nodes having a memory and being configured to access said memory according to physical memory addresses in a physical memory address space, wherein memory address translations between said virtual memory addresses and said physical memory addresses are provided, by memory address translation circuitry, in units of memory pages having a page size, and wherein the range of memory addresses for a given data handling transaction issued by the requesting node to the home node lies within a single memory page; and a coherency controller to control coherency amongst data stored by the data processing system;

the home node being configured, in response to the data handling transaction, to issue one or more data handling instructions to cause one or more given nodes of the one or more further nodes to perform the data transfer, the home node being configured to notify completion to the requesting node in response to the issue of the data handling instructions to the one or more given nodes.

12. A method comprising:

a requesting node issuing a data handling transaction to a home node in a data processing system having the requesting node, the home node to control coherency amongst data stored by the data processing system and one or more further nodes, at least one of the further nodes having a memory, the data handling transaction defining a data transfer relating to a range of memory addresses;

the requesting node maintaining an address hazard at the requesting node inhibiting issue of another data handling transaction for that range of memory addresses until the requesting node is notified by the home node that the data handling transaction has completed;

the home node, in response to the data handling transaction, issuing one or more data handling instructions to cause one or more given nodes of the one or more further nodes to perform the data transfer; and the home node notifying completion to the requesting node in response to the issue of the one or more data handling instructions to the one or more given nodes, the method further comprising:

the requesting node initiating data handling transactions according to virtual memory addresses in a virtual memory address space;

the one or more further nodes accessing memory according to physical memory addresses in a physical memory address space; and memory address translation circuitry providing memory address translations between virtual memory addresses and physical memory addresses in units of memory pages having a page size, wherein the range of memory addresses for a given data handling transaction issued by the requesting node to the home node lies within a single memory page.

* * * * *